(12) United States Patent
Couture-Gagnon

(10) Patent No.: US 7,733,338 B2
(45) Date of Patent: Jun. 8, 2010

(54) REDUCTION OF A MESH WITH PRESERVATION OF FLOW LINES

(75) Inventor: Jérôme Couture-Gagnon, Longueuil (CA)

(73) Assignee: AUTODESK, Inc., San Rafael, CA (US)

( * ) Notice: Subject to any disclaimer, the term of this patent is extended or adjusted under 35 U.S.C. 154(b) by 320 days.

(21) Appl. No.: 10/894,524

(22) Filed: Jul. 20, 2004

(65) Prior Publication Data

US 2006/0017721 A1   Jan. 26, 2006

(51) Int. Cl.
G06T 15/00 (2006.01)
G06T 17/00 (2006.01)

(52) U.S. Cl. .................. 345/419; 345/420; 345/423

(58) Field of Classification Search .................. None
See application file for complete search history.

(56) References Cited

U.S. PATENT DOCUMENTS

| 6,362,820 B1 * | 3/2002 | Hoppe | 345/423 |
| 6,879,324 B1 * | 4/2005 | Hoppe | 345/423 |
| 2005/0093863 A1 * | 5/2005 | Hoppe et al. | 345/420 |

OTHER PUBLICATIONS

Chandrajit L Bajaj, Valerio Pascucci, and Guozhong Zhuang, "Progressive Compression and Transmission of Arbitrary Triangular Meshes", Dept of Computer Sciences, Univ of Texas at Austin, 1999 IEEE.*

Michael Garland and Paul S. Heckbert- "Surface Simplification Using Quadric Error Metrics", Carnegie Mellon Univ, Proceedings of SIGGRAPH '97.*

Wang CCL, Yuen MMF. Sketch based mesh extrusion with remeshing techniques, Proceedings of DETC'01 ASME 2001 Design Engineering Technical Conferences, Pittsburgh, Pennsylvania, Sep. 9-12, 2001.*

Hoppe, Hugues, "Progressive Meshes", Proceedings of SIGGRAPH '96, Aug. 1998, 10 pages.

Lindstrom, Peter et al., "Fast and Memory Efficient Polygonal Simplification", Proceedings of IEEE Visualization '98, 1998, pp. 279-286.

* cited by examiner

Primary Examiner—Daniel F Hajnik
(74) Attorney, Agent, or Firm—Patterson & Sheridan, LLP

(57) ABSTRACT

To preserve flow line characteristics in a reduced mesh, the mesh is reduced by identifying one or more flow lines in the mesh and removing a plurality of edges associated with the one or more flow lines. Such a reduction may be achieved by identifying a set of connecting edges between adjacent flow lines, or between portions of adjacent flow lines, and contracting these connecting edges in one step. The set of connecting edges to contract in any given iteration may be identified based on the flow lines. A cost metric also may be used to decide which connecting edges are in the set to be contracted. In a first technique, a lowest cost edge is selected, and other connecting edges between the same adjacent flow lines are added to the set until a threshold condition is met. This threshold condition balances preservation of flow lines with preservation of attributes. In a second technique, several sets of connecting edges are identified. The set of connecting edges with the lowest cost is contracted in each iteration, and the cost of each set is updated after each iteration.

14 Claims, 10 Drawing Sheets

General

Reduction Amount
- Units _____ Ratio ▽    600
- ☐ Ratio _____ 50
- ☐ Vtx Count ____ 29
- ☐ Tri Count ____ 54

Smooth transitions _____ ☐

Connected Weight Map    608
- ☐ Multiplier ____ 1

Invert _____ ☐

Shape
Sharpness _____ 0.5
Preserve volume ____ 0    602

Quad preservation
Reduce parallel edge loops _____ ☐    604
Preserve quad lines __ 0

Symmetry
Enforce symmetry _____ ☑
Use symmetry map _____    606
Tolerance level ____ 6

FIG. 6A

REDUCTION OF A MESH WITH PRESERVATION OF FLOW LINES

BACKGROUND

Polygon reduction is a term used to describe techniques for reducing the complexity of a polygon mesh while minimizing alterations to attributes of the polygon mesh. Example attributes of a polygon mesh include but are not limited to its general shape, sharpness of features, color variations, etc. A polygon mesh of reduced complexity uses less memory and is faster to display.

A widely used technique for polygon reduction is based on the progressive mesh algorithm described by Hugues Hoppe in "Progressive Meshes," in *Proceedings of SIGGRAPH '96*, pages 99-108, August 1996 ("Hoppe"). The algorithm involves iteratively contracting adjacent vertex pairs (or edges between them) into one vertex, which is then positioned to minimize attribute changes. At each iteration, the algorithm chooses the pair that will be contracted with the minimal attribute change. The quantification of this change is called a "cost." This cost can be computed using various metrics, such as described in "Surface Simplification Using Quadric Error Metrics," by M. Garland and P. Heckbert in *Proceedings of SIGGRAPH '97*, pages 209-216 ("Garland"), and in "Fast and Memory Efficient Polygonal Simplification," by P. Lindstrom and G. Turk, in *Proceedings of IEEE Visualization '98*, pages 279-286 ("Lindstrom").

SUMMARY

Many 3D modeling artists prefer using polygon meshes that are composed mainly of quadrilaterals, usually having many sub-regions with grid-like connectivity. The grid-like topology is usually a reflection of artist-chosen natural flow lines for a model. Each edge in a grid-like sub-region of a polygon mesh belongs locally to one of two intersecting sets of flow lines. If a polygon mesh is reduced by contracting vertex pairs, based solely on a cost metric that considers changes to local attributes, the reduced polygon mesh often loses some flow line characteristics.

To preserve flow line characteristics in a reduced mesh, the mesh is reduced by identifying one or more flow lines in the mesh and removing a plurality of edges associated with the one or more flow lines. Such a reduction may be achieved by identifying a set of connecting edges between adjacent flow lines, or between portions of adjacent flow lines, and contracting these connecting edges in one step. The set of connecting edges to contract in any given iteration may be identified based on the flow lines. A cost metric also may be used to decide which connecting edges are in the set to be contracted. In a first technique, a lowest cost edge is selected, and other connecting edges between the same adjacent flow lines are added to the set until a threshold condition is met. This threshold condition balances preservation of flow lines with preservation of attributes. In a second technique, several sets of connecting edges are identified. The set of connecting edges with the lowest cost is contracted in each iteration, and the cost of each set is updated after each iteration.

Accordingly, in one aspect, a three-dimensional mesh is reduced while preserving flow lines in the mesh. The three-dimensional mesh comprises a plurality of vertices and a plurality of edges interconnecting the vertices. Such reduction involves identifying one or more flow lines in the mesh and removing a plurality of edges associated with at least one flow line. In one embodiment, reduction involves selecting a plurality of connecting edges, wherein the connecting edges are edges in the three-dimensional mesh that intersect adjacent flow lines in the three-dimensional mesh. The selected connecting edges are contracted to provide a reduced three-dimensional mesh, by replacing each connecting edge with a vertex, modifying each edge in the three-dimensional mesh that connected to an endpoint of the connecting edge so that the edge has the vertex as an endpoint, and merging flow line edges sharing vertices that replaced connected edges. The steps of selecting and contracting are repeated on the reduced three-dimensional mesh until a desired amount of reduction of the three-dimensional mesh is achieved.

BRIEF DESCRIPTION OF THE DRAWINGS

FIGS. 6A and 6B illustrate an example graphical user interface that allows a user to provide inputs for the mesh reduction operation.

DETAILED DESCRIPTION

A mesh reduction operation may be applied to a three dimensional geometrical primitive, such as a polygon mesh, a NURBS surface mesh or other object that is a combination of vertices and edges that define faces in three dimensions. A three dimensional geometrical primitive G generally is defined as a set of n control vertices $V=\{V_i: 1<=i<=n\}$, each being associated to a position triplet $P_{Vi}=(x_i, y_i, z_i)$. An example of a three-dimensional geometrical primitive is a mesh. A mesh is defined by specifying faces, vertices and edges. The vertices and edges define n-sided faces. Typically, a mesh has faces that are mostly, but not necessarily all, quadrilaterals. Some three-dimensional meshes have edges that are not line segments, but may be curves. Some three-dimensional meshes also have faces that are not planar.

A mesh generally is represented in a computer by three arrays that store information about the vertices, edges (whether line segments or curves) and faces (whether planar or not). The data structure representing each vertex may include, for example, data defining its position as well as the indices of the neighboring edges and faces. The data structure representing each edge may include, for example, data defining the indices of its end vertices and the indices of the two adjacent faces. The data structure representing each face may include, for example, data defining the indices of its neighboring faces, edges and vertices.

Conceptually, flow lines in a mesh are those lines that an artist defines while constructing the mesh that generally define the curvature, flow or grade of the surface. Because many faces of such a mesh are usually quadrilaterals, there are generally two sets of flow lines that intersect each other to create these quadrilaterals. Within each set of flow lines, the flow lines are substantially non-intersecting in local areas of the surface of the object. A non-quadrilateral mesh may be constructed with flow lines too. For example, some triangular meshes may contain, in a subset of their edges, two or three sets of noticeable flow lines.

Topologically, flow lines are defined by sets of edges. Each edge in the mesh may be classified either as part of a "flow line" or as a connecting edge between two flow lines. These sets may be determined by selecting an initial edge and classifying the selected edge either as part of a flow line or as a connecting edge. An initial edge may be selected, for example, randomly or by identifying the edge that has the lowest associated cost for contraction, or by any other means. The remaining edges may be classified accordingly through a traversal of the mesh. The set of connecting edges between two flow lines defines a "stripe."

Figure 1:
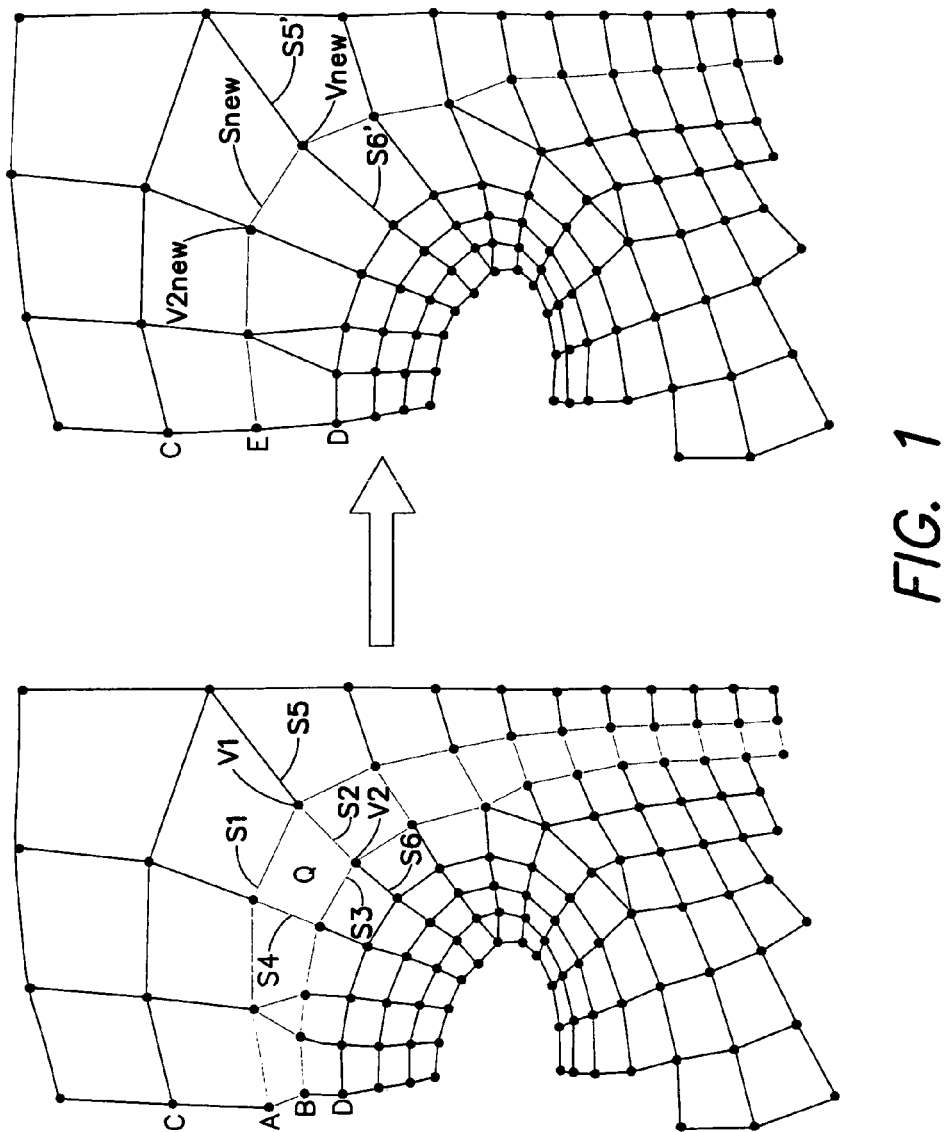
FIG. 1 is an illustration of an example mesh.

For example, referring to FIG. 1 which illustrates an example mesh, two adjacent flow lines A and B are shown. In such a mesh, any quadrilateral Q can be defined locally as containing four segments S1, S2, S3 and S4, such that with flow lines such as A and B, S1 is connected to S2, S3 to S2, S3 to S4, and S4 to S1, S1 is an edge in flow line A, S2 is a connecting edge between flow line A and flow line B, S3 is an edge of flow line B and S4 is a connecting edge between flow line B and flow line A. In such a mesh, all of the faces between the flow lines A and B are represented by two sets of edges. The first set of edges includes the edges of the flow lines A and B. The second set of edges includes the connecting edges between these flow lines.

To reduce a mesh while preserving these flow lines involves an iterative process in which, at each iteration, a plurality of edges associated with at least one flow line are removed. For example, selected adjacent flow lines, or portions of such flow lines, may be contracted into a single flow line. Thus, in each iteration, all connecting edges between the selected adjacent flow lines, or portions of such flow lines, are removed and flow line edges of the adjacent flow lines are merged into a single flow line. Iterations are performed until a desired level of reduction is achieved.

Referring again to FIG. 1, the two adjacent flow lines A and B are contracted to generate a new flow line E. In this contraction step, two vertices V1 and V2 defining a connecting edge, such as S2, are contracted into one new vertex Vnew positioned so as to minimize attribute changes. Edges adjacent to a contracted edge, such as S6 and S5, are modified so that the new vertex Vnew now defines an endpoint of each of these edges, now S6' and S5'. Edge S4 is similarly contracted to create a vertex V2new. Flow lines C and D remain unchanged. The contraction of edges S2 and S4 causes edges S1 and S3 to be connected to the same two vertices, such as Vnew, created from the contraction of S2, and V2new, created from the contraction of S4. One edge between S1 and S3 is removed, and the other one, now labeled Snew, connects Vnew and V2new. Ideally, each operation in each iteration of reducing the mesh is performed based on the geometry of the mesh before that iteration.

Two different example techniques for reducing a mesh while preserving flow lines will now be described. In both examples, the data structure representing the mesh also includes, for each edge, a computed cost for the edge using an appropriate cost metric. Example cost metrics are explained in more detail below.

Figure 2:
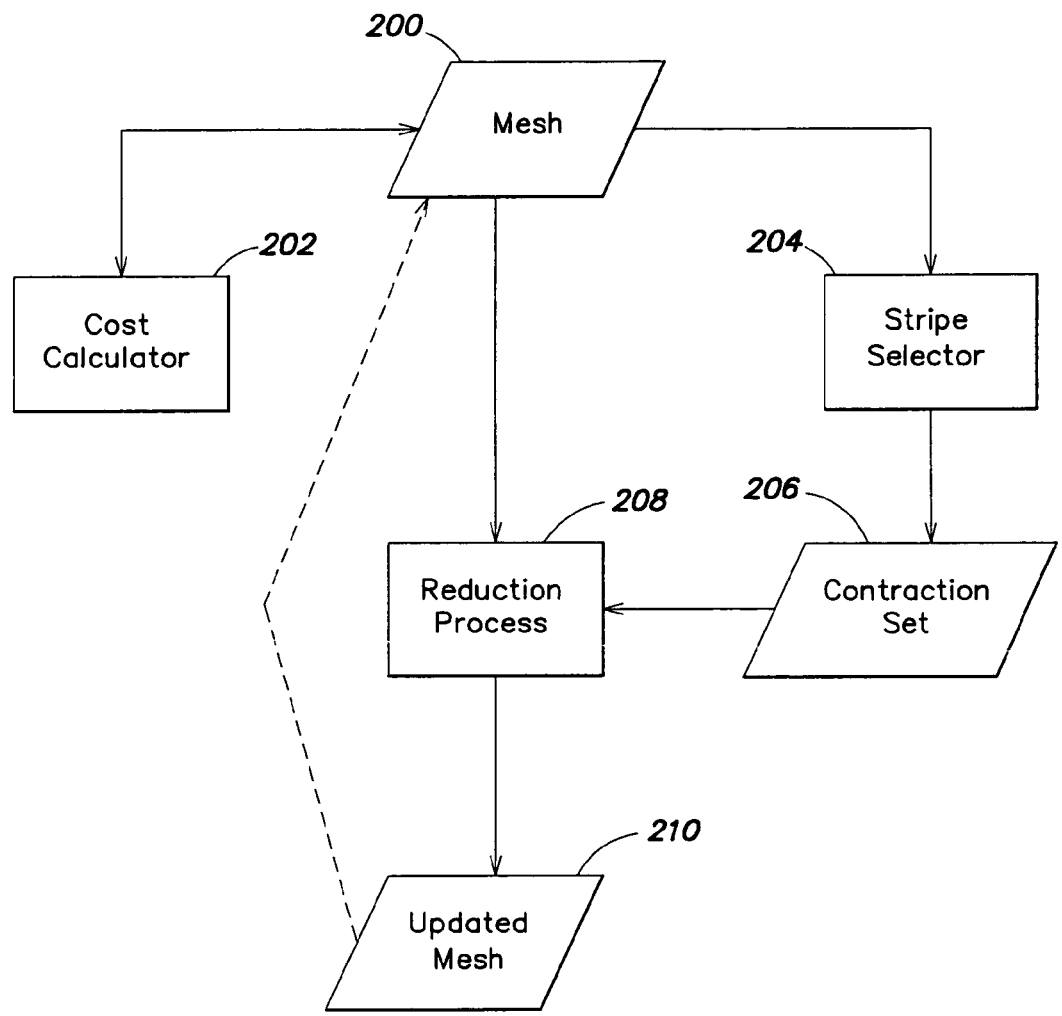
FIG. 2 is a data flow diagram illustrating a first example technique for reducing a mesh while preserving flow lines.
Figure 3:
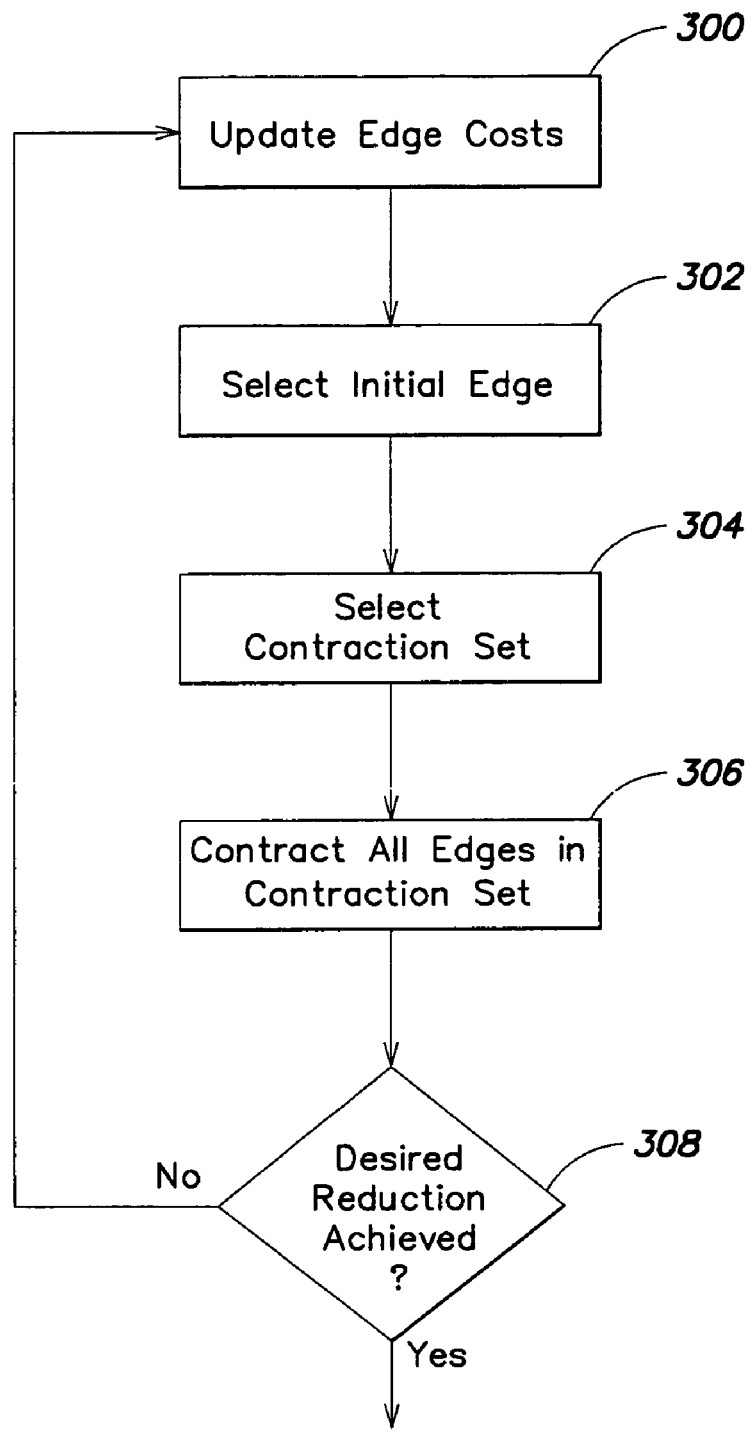
FIG. 3 is a flow chart describing the dataflow diagram of FIG. 2.

A data flow diagram shown in FIG. 2 and the flow chart of FIG. 3 are illustrative of a first technique in which a connecting edge may be considered as part of a stripe to be contracted based on a cost associated with the edge. In FIG. 2 an input mesh 200 is provided to a cost calculator 202 which computes and updates the cost of each edge of the mesh according to a cost metric. Example cost metrics are explained in more detail below.

The input mesh 200 with computed edge costs is input to a stripe selector 204 which selects a set of connecting edges to contract, called the contraction set 206. For example, the stripe selector may initially select an edge, e.g., with the lowest cost, and add that selected edge to a contraction set. Connecting edges in both directions along the adjacent flow lines connected by the selected edge also are added to the contraction set.

One or more limits may be applied to control whether a connecting edge along flow lines is added to the contraction set. An example limit is to add an edge to the contraction set only if it has a cost below a threshold based on the cost of the edge with the lowest cost in the mesh which is not already in the contraction set. Such a threshold may be, for example, two times the cost of that lowest cost edge. This heuristic provides good control over flow line preservation, because the threshold balances between continuing to grow the contraction set (flow line preservation) and starting a new contraction set on the next edge of lower cost (general attribute preservation). Another example for applying such a limit is to place a connected edge in a stripe if it has a cost below a threshold based on the cost of the initially selected edge, such as two times the cost of the initially selected edge. The threshold may be made user-adjustable through an appropriate interface. A stripe also may be terminated, for example, if it ends on itself, or it reaches a hole or an edge on a geometric border in the mesh. A stripe may also be terminated by flow line topological changes, such as the end of one of the adjacent flow lines, the intersection of the adjacent flow lines, the merging of the adjacent flow-lines, and the non-trivial split of one of the adjacent flow lines.

The input mesh 200 and the contraction set 206 defined by the stripe selector 204 are then input to the reduction process 208, which contracts all edges in the contraction set. To contract an edge in a contraction set, the vertices defining the endpoints of the edge may be deleted from the mesh. Then, a new vertex may be added between the positions of the deleted vertices, for example, at a point that minimizes any attribute change. Instead of creating a new vertex, one of the vertices may be modified whereas the other may be deleted. Any edge in the mesh that had, as one of its endpoints, one of the deleted vertices, may be modified to have the new vertex as its new endpoint. Edges that are along the flow line are merged together, for example by deleting one of the edges and modifying the other edge such that its end vertices are the new vertices. The modified mesh is then output as the updated mesh 210. The updated mesh 210 is then input to the cost calculator 202 which updates the cost of any edge for which the cost has been invalidated by changes to the mesh. The operations performed by the modules in this data flow diagram are repeatedly applied until the resulting mesh has a user-designated percent reduction in complexity from the original mesh.

For every vertex and edge that is computed by the reduction process 208, new positions may be computed in such a way that the modification of one vertex or edge does not affect the computation of another vertex or edge. This computation can be performed, for example, by storing the newly computed positions in temporary storage. After all the new positions have been computed, the new positions may be transferred from temporary storage. Thus, the updated mesh 210 becomes the input mesh 200 for a next iteration after the contraction and cost updates are completed.

The flowchart of FIG. 3 describes a process performed by the system shown in FIG. 2. In particular, the edge costs of an input mesh are updated 300, in the manner described above. An initial edge is selected 302 based, for example, on the lowest cost. The contraction set is then selected 304 by the stripe selector 204 (FIG. 2). The reduction process 208 (FIG.

2) then contracts 306 all edges in the contraction set. If the desired reduction is achieved, as determined at 308, the process is complete, otherwise another iteration of the process is performed, initially by updating 300 the edge costs of the updated mesh.

In another technique for reducing polygons while preserving flow lines, the sets of connecting edges of several stripes are identified. The connecting edges of the lowest cost stripe may be contracted in each iteration, and the cost of each stripe is updated after each iteration.

Using this technique, the data structure for a mesh also includes an identifier of a stripe in which connecting edges are included. Depending on the stripe cost computation method, additional data structures may be used to represent each stripe, such as including for each stripe the number of connecting edges in the stripe, a sum of all of the costs computed for the connecting edges in the stripe, and an average of all of the costs computed for the connecting edges in the stripe. For the stripe cost computation described below, such a data structure permits a local update of the cost of all the stripes after reduction of one stripe, with a computational time proportional to a number of connecting edges of the reduced stripe.

Figure 4:
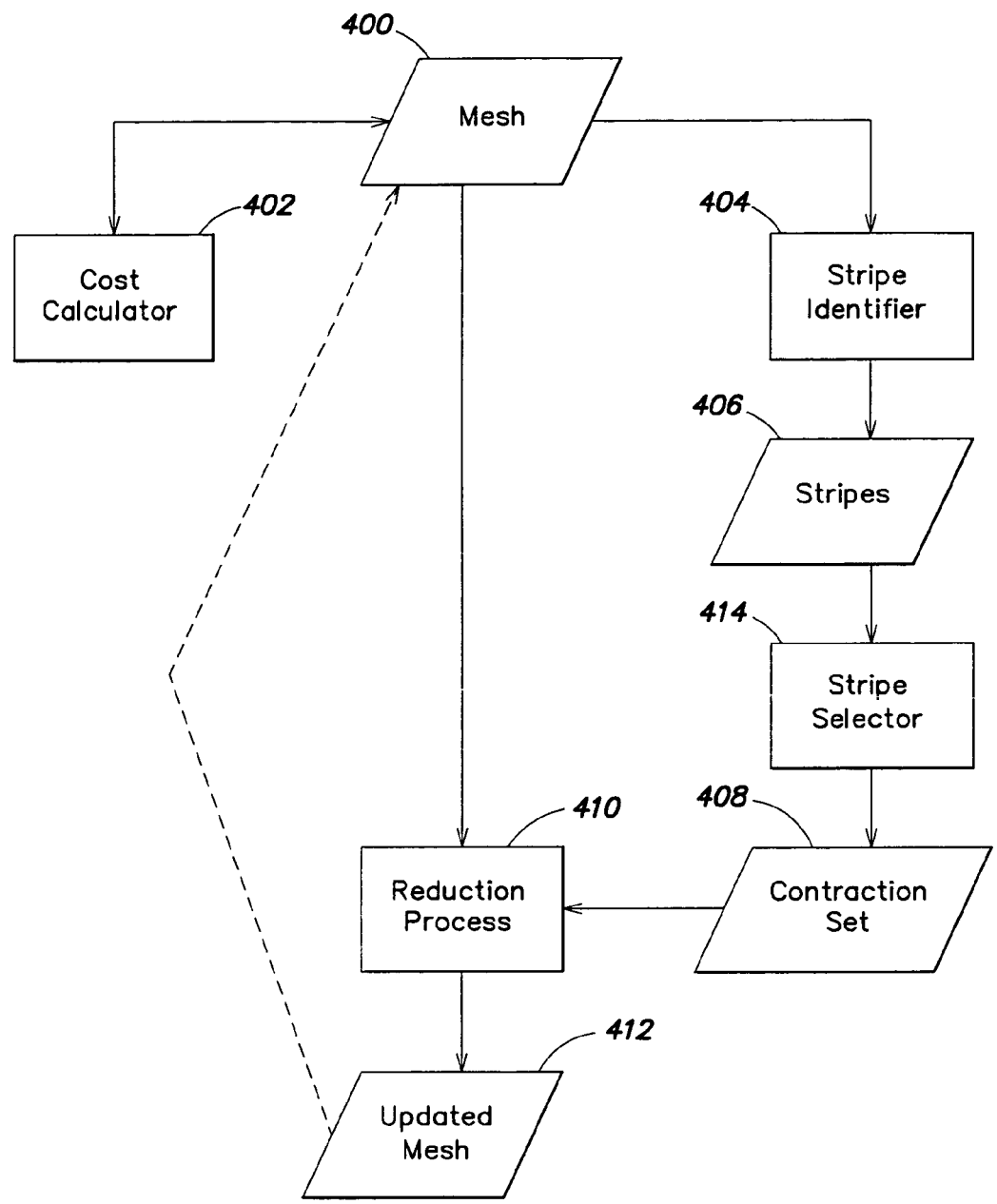
FIG. 4 is a data flow diagram illustrating a second example technique for reducing a mesh while preserving flow lines.
Figure 5:
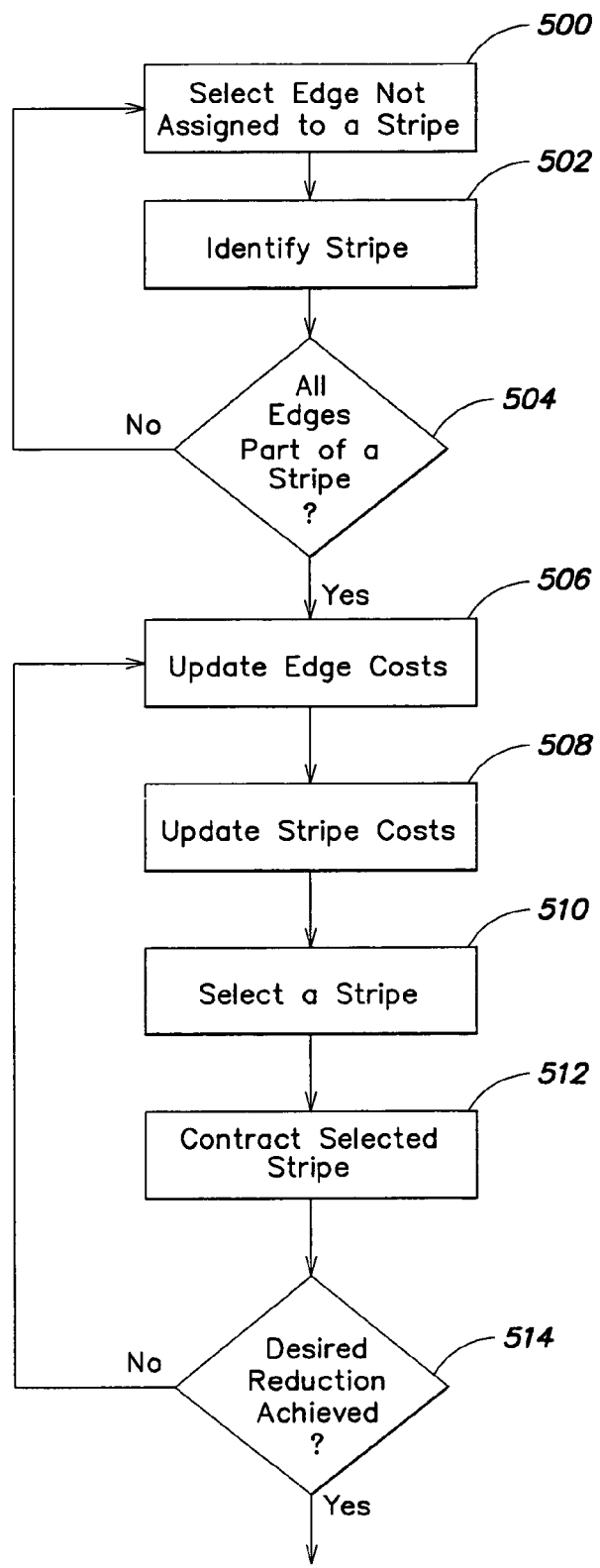
FIG. 5 is a flow chart describing the dataflow diagram of FIG. 4.

A data flow diagram shown in FIG. 4 and the flow chart of FIG. 5 are illustrative of this second technique. The operations performed by the modules in the data flow diagram of FIG. 4 are repeatedly applied until the resulting mesh has a user-designated percent reduction in complexity from the original mesh. In FIG. 4 an input mesh 400 is provided to a cost calculator 402 which computes and updates the costs values for each edge of the mesh according to a cost metric. Example cost metrics are explained in more detail below.

The input mesh 400 with computed edge costs is input to a stripe identifier 404 which identifies the connecting edges of a number of stripes 406 in the mesh. For example, the stripe identifier initially selects an edge and adds that selected edge to the set of connecting edges of a stripe. If the edges are numbered, for example, arbitrarily from 0 to N−1, where there are N edges, the initial edge could simply be edge 0. Connecting edges in both directions along the adjacent flow lines connected by the selected edge also are added to the set of connecting edges of the stripe. A stripe also may be terminated, for example, if it ends on itself, or it reaches a hole or an edge on a geometric border in the mesh. A stripe may also be terminated by flow line topological changes, such as the end of one of the adjacent flow lines, the intersection of the adjacent flow lines, the merging of the adjacent flow-lines, and the non-trivial split of one of the adjacent flow lines. An edge is added to the set of connecting edges of a stripe by adding the stripe identifier to the edge data structure. The cost data for the stripe in the stripe data structure also may be updated using the edge costs of its connecting edges. After a first stripe is defined, additional stripes are defined through an iterative process. An initial connecting edge of a subsequent stripe is selected and the process is repeated. For example, if the edges are numbered, the next edge could simply be the lowest number edge that is not in a stripe. These additional stripes also may be terminated when they reach an edge that has been assigned already as a connecting edge to a previously defined stripe. The process of identifying stripes terminates when each edge is assigned as a connecting edge to only one stripe.

This stripe identification process does not use edge cost, but could take edge cost and some threshold into account for terminating a stripe in the same manner as described above in connection with the first technique.

After identifying the connecting segments of stripes 406 in the mesh (and in the process computing per-stripe costs), the set of connecting edges of the stripe with the lowest cost is selected by a stripe selector 414 as a contraction set 408. The selection of a stripe to contract may be based on a cost associated with each connecting edge in the stripe. An appropriate cost metric to use to select a stripe may be a function of the costs of all of the connecting edges in the stripe, or may be a metric that evaluates the stripe as a whole, taking into account the interrelations among the individual connecting edges. An example cost metric is, but is not limited to, an average of the costs computed for each connecting edge in the stripe. Another cost metric is a maximum cost among costs computed for all of the connecting edges in the stripe. Yet another cost metric is a minimum cost among costs computed for all of the connecting edges in the stripe. Another cost metric could take be a function of the average and the variance of the costs among costs computed for all of the connecting edges in the stripe.

As in the technique described above in connection with FIGS. 2 and 3, this contraction set 408 is input to the reduction process 410, which contracts all edges in the mesh that are in the contraction set. The modified mesh is then output as the updated mesh 412.

As in the technique described above in connection with FIGS. 2 and 3, after updating the mesh, the edge costs in the mesh are updated by the cost calculator 402. The stripe costs also are updated based on the updated edge costs. For example, if the stripes cost defined as an average of the costs computed for each connecting edge in the stripe, one way to efficiently update stripe costs is to compute the change in each edge cost when computing the edge cost. The cost of the stripe in which each modified edge resides is updated accordingly by adding the change to the stripes' edge cost sum. The stripe cost is recomputed by diving the updated sum by the number of connecting edges in the stripe. In the case of a stripe with contracted or removed edges, the stripe's number of edges is decreased accordingly before recomputing the average. The stripe selector 406 then may select the next stripe to be contracted.

The flowchart of FIG. 5 describes a process performed by the system shown in FIG. 4. In particular, multiple stripes are identified by the stripe identifier 404 (FIG. 4). For example, an edge that is not assigned to a stripe is selected 500. A stripe having this initial edge as one of its connecting edges is then defined 502. If all edges are not defined as part of a stripe (as determined in step 504), an iterative process is followed by returning to step 500 and repeating the definition of stripes until all edges are part of a stripe. The edge costs are updated 510, and the stripe costs are updated 508. A stripe selector 414 (FIG. 4) then selects 510 a stripe for contraction. The reduction process 410 (FIG. 4) then contracts 512 all connecting edges in the selected stripe. If the desired reduction is achieved, as determined at 514 the process is complete, otherwise another iteration of the process is performed, initially by updating 508 the edge costs and updating 508 the stripe costs of the updated mesh before selecting a next stripe.

Figure 7A:
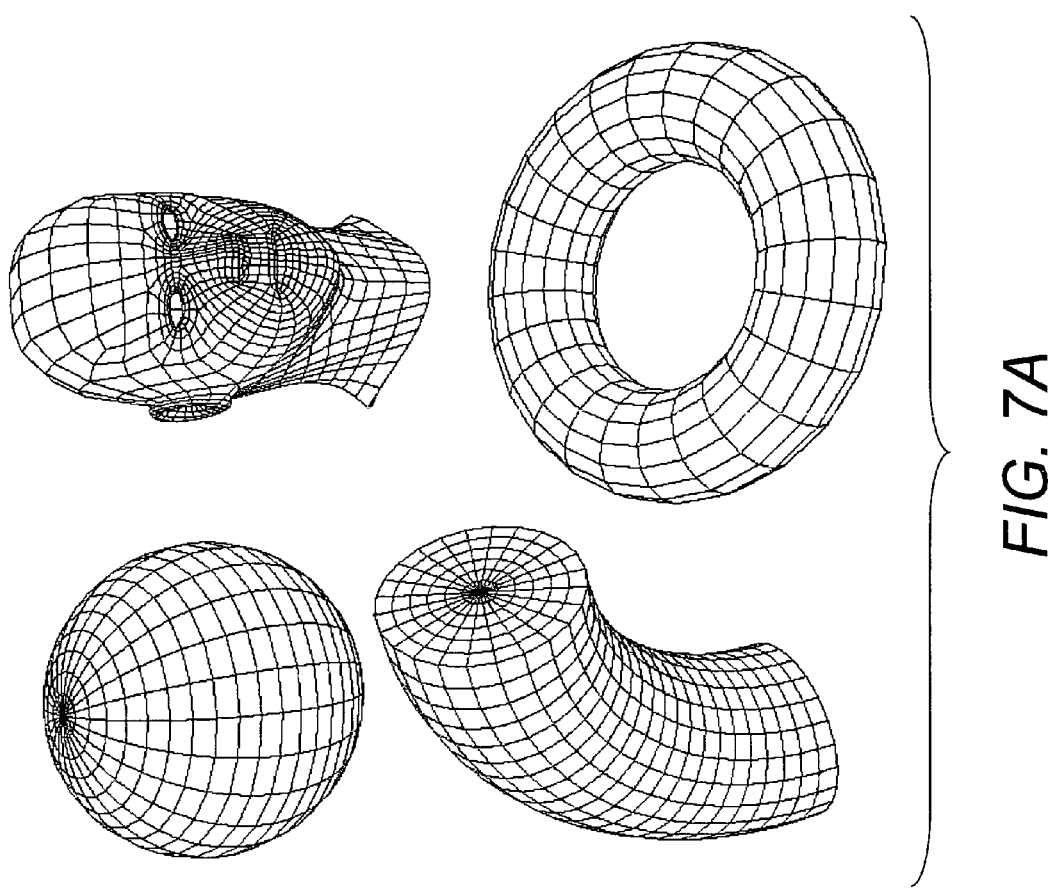
FIGS. 7A through 7C illustrate example meshes under different techniques for reduction.
Figure 7B:
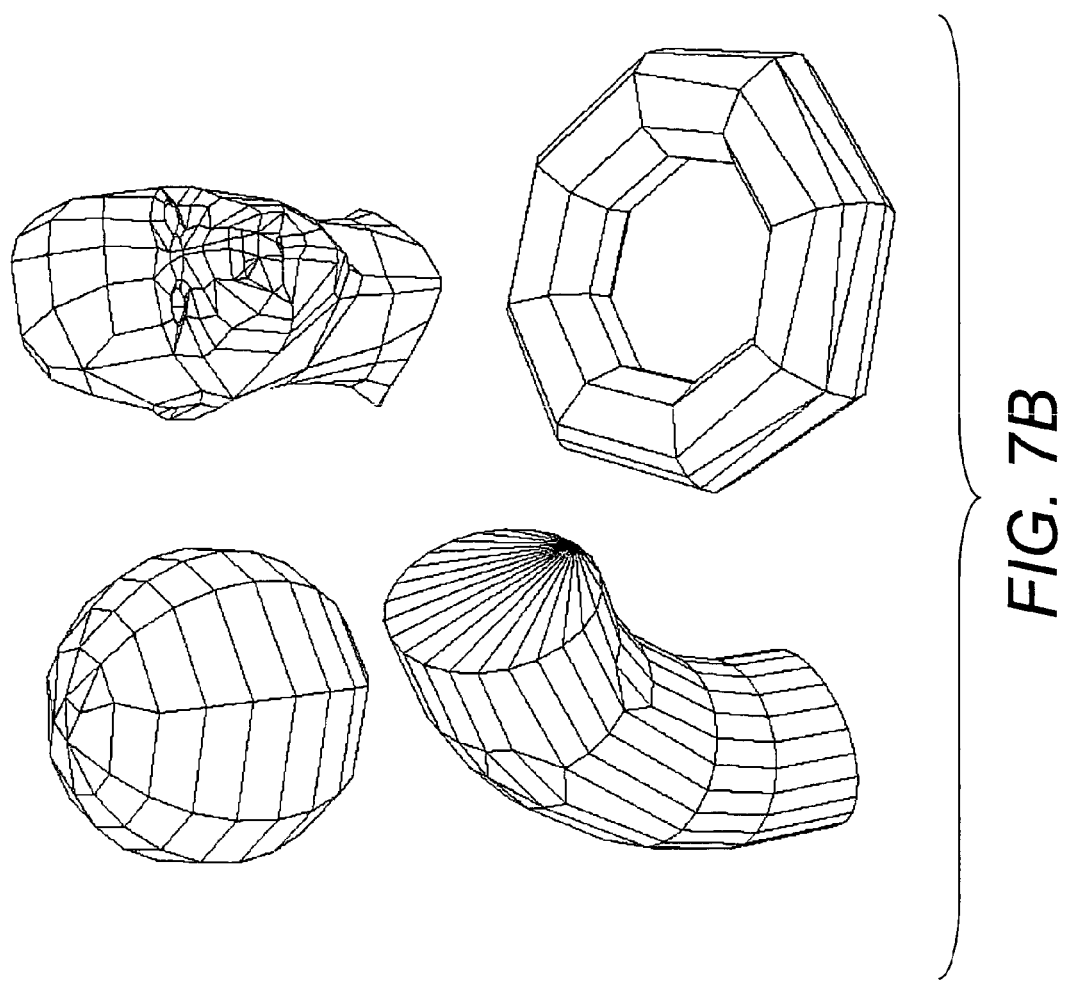
Figure 7C:
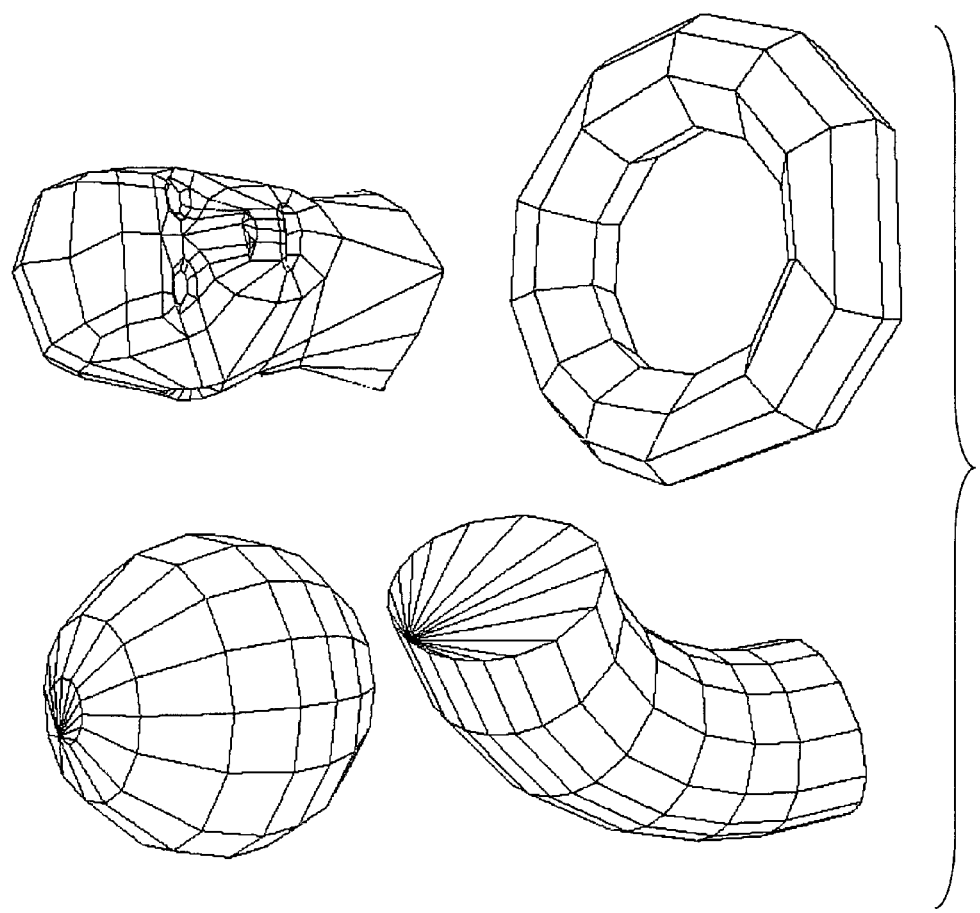

FIG. 7A illustrates an example mesh in an initial state. FIG. 7B illustrates the example mesh reduced using the first technique in which costs are used to limit whether a connecting edge is added to a contraction set. In this technique, reduction balances preservation of flow lines with preservation of attributes. FIG. 7C illustrates the example mesh reduced using the second method in which costs are not used to add connecting edges to a stripe. In this technique, parallel edge loops generally are preserved.

There are yet other methods for reducing a mesh while preserving flow lines. For example, it is possible to remove a single flow lines, or portion thereof, instead of contracting connecting edges between two flow lines. After removal of a vertices and edges in a flow line, any edges connect to that flow line are reconstructed so as to connect to the adjacent flow lines. Another example is to first remove the polygons and the contracting edges of a stripe, creating a hole in the mesh, and then merging the flow lines' vertices (which are now part of the hole borders) based on position proximity.

Having now described several techniques for reducing a mesh, example cost metrics for computing the cost of each edge in a mesh will now be described. It is possible to use any conventional cost metric, such as those described in Garland and Lindstrom above, to compute each edge cost. The cost metric described in Garland can be modified to be sensitive to sharpness of the mesh by locally normalizing all edges' lengths while computing the costs. In other words, the cost is computed as if all edges have a length of 1.0. A cost metric may reflect a user-designated combination of these two metrics. For example, if A represents the cost computed using the techniques in Garland, and B represents the cost computed by the modified cost metric, another cost metric may be computed by C=U*A+(1−U)*B, where U is greater than or equal to 0 and less than or equal to 1. The value U may be defined by a user using a suitable interface.

The cost metric also may represent a weighted combination of several factors, with the weight (between 0 and 1) of each factor being separately selectable by a user through an appropriate interface. This overall cost also may be weighted by a user-defined weight map that covers the object and specifies a per vertex modulation. Example factors that may be included in the cost of an edge include, but are not limited to:

a. A surface boundary cost, which is 1 if the edge is a border, or 0 otherwise.

b. A subproblem boundary cost, which is 1 if the edge is on the border between a reduced region and a non-reduced region, or 0 otherwise, where the reduced region is defined by an input cluster of vertices.

c. A protected vertex cost, which is 1 if collapsing the edge will remove a vertex specified as "protected" by the user (also called a connected vertex cluster), and 0 otherwise.

d. A hard edge cost, which is 1 if the edge is a hard edge, or 0 otherwise.

e. A crease edge cost, which is 1 if the edge is a crease, or 0 otherwise.

f. A material boundary cost, which is 1 if the edge is a material border (with different material on both sides), or 0 otherwise.

g. A property discontinuity cost, which is 1 if the edge is on a discontinuity in property space, or 0 otherwise.

h. Property change costs, which is a metric that quantifies a change caused by contraction of the edge for each property space. Distinct weights can be provided for each property type. Example property types include node colors, texture coordinates, vertex weight maps, and user surface normals. For example, in the case of a mesh with node colors, an edge contraction can cause a color change, and the cost for this color change depends on the color difference and the area of the underlying surface.

An example user interface for setting the variables used in the reduction techniques described above is shown in FIGS. 6A and 6B. In this user interface, user options are represented in tabs, and each tab has sub-categories.

The "Reduction Amount" sub-category 600 of the tab in FIG. 6A contains options to control the amount of reduction. Such options include a menu for selecting the units in which the amount of reduction is expressed, and sliders or associated input text boxes to provide a value indicative of the amount of desired reduction. The amount of desired reduction may be expressed in terms of a ratio, a vertex count or a triangle count. A user may indicate whether transitions in the mesh should be smoothed.

The "Connected Weight Map" 608 of the tab of FIG. 6A indicates whether a user-specified weight map is associated with the mesh. A multiplier to be applied to the weight map may be specified using a slider or associated input text box. This weight map also may be optionally inverted.

Figure 6B:

The "Shape" sub-category 602 of the tab of FIG. 6A, and the sub-categories of the tab of FIG. 6B provide control over the cost metric. In particular, the sharpness value controls the preservation of small but sharp features by interpolating between cost according to a sharpness-sensitive metric and a cost according to a non sharpness-sensitive metric. The preserve volume value controls mesh geometric volume preservation by displacing vertices to compensate the volume gain or loss caused by removal of any edge or vertex. In FIG. 6B, the user can specify weights primarily using a slider or associated input text box, for a combination of several factors, such as those noted above.

The options related to flow-lines preservation are presented under the "Quad preservation" sub-category 604 of the tab in FIG. 6A. The "Preserve quad lines" slider gives control for the threshold used by the first method. When the value is zero, there is no flow lines preservation. When the value is one, there is maximum flow lines preservation (using the first method). The "Reduce parallel edge loops" option enables the user to use the second method. In that case, the "Preserve quad lines" slider is disabled. Although this user interface does not illustrate a control for any threshold used in the second method, such a control could be provided.

Finally, there are options about symmetry preservation in the "Symmetry" sub-category 606 of the tab of FIG. 6A. The cost algorithm described in Hoppe can be modified to optionally preserve the symmetric properties of a mesh. Such preservation involves ensuring that parts of a mesh that are symmetric before reduction also are symmetric after reduction. This symmetry can be only topological, such that each component, such as vertices, edges and polygons, can be paired with other symmetric components. Additionally, this symmetry can extended to the attributes, such that symmetric components additionally have symmetric attributes, such as positions, colors and texture coordinates. To maintain symmetry through the reduction process involves an additional step of adding, to the contraction set, all the symmetric edges that correspond to those edges in the contraction set. Additionally, edges joining a pair of symmetric vertices are replaced by a vertex which is positioned symmetrically relatively to the contracted vertices. This symmetrical preservation enhancement has the property of maintaining symmetric flow lines when used in conjunction with a flow-line preserving reduction of a mesh. The symmetric correspondence between components can be found by analyzing the mesh, or can be provided by the user through correspondence tables.

In the context of mesh reduction, an efficient way of detecting symmetric parts is to pair edges based on their reduction cost computed by the reduction cost metric. Because this cost is very sensitive to topological and attribute characteristics of individual edges, it can provide a reliable pairing of edges in the context of a symmetric mesh. In the context of the second reduction method, such cost-based symmetric pairing can be directly extended to stripes. However, numerical imprecision can lead to tiny differences between the costs of symmetrical components. A threshold is provided, and made controllable by the user, to enable the symmetrical matching of components with small cost differences. The checkbox "enforce symmetry" in FIG. 6A turns the symmetrical reduction on or off. If on, a symmetry map specifying symmetrical correspondence of components may optionally be added. If there is no symmetry map provided, cost-based symmetrical correspondence is used, and a slider provides control for the numerical imprecision tolerance.

The various components of the system described herein may be implemented as a computer program using a general-purpose computer system. Such a computer system typically includes a main unit connected to both an output device that displays information to a user and an input device that receives input from a user. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, a cathode ray tube (CRT) display, liquid crystal displays (LCD) and other video output devices, printers, communication devices such as a modem, and storage devices such as disk or tape. One or more input devices may be connected to the computer system. Example input devices include, but are not limited to, a keyboard, keypad, track ball, mouse, pen and tablet, communication device, and data input devices. The invention is not limited to the particular input or output devices used in combination with the computer system or to those described herein.

The computer system may be a general purpose computer system which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services.

A memory system typically includes a computer readable medium. The medium may be volatile or nonvolatile, writeable or nonwriteable, and/or rewriteable or not rewriteable. A memory system stores data typically in binary form. Such data may define an application program to be executed by the microprocessor, or information stored on the disk to be processed by the application program. The invention is not limited to a particular memory system.

A system such as described herein may be implemented in software or hardware or firmware, or a combination of the three. The various elements of the system, either individually or in combination may be implemented as one or more computer program products in which computer program instructions are stored on a computer readable medium for execution by a computer. Various steps of a process may be performed by a computer executing such computer program instructions. The computer system may be a multiprocessor computer system or may include multiple computers connected over a computer network. The components shown in FIG. 1 may be separate modules of a computer program, or may be separate computer programs, which may be operable on separate computers. In an object-oriented system, these modules may represent method that may be performed on a mesh or other object for which they are defined. These modules, or a part of these, could be used within a more complex process which would include some polygon reduction processing as a part of its internal steps. These modules, or some of them, also may support customization through a plug-in architecture. The data produced by these components may be stored in a memory system or transmitted between computer systems.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A computer-implemented method for reducing a three dimensional (3D) mesh, the method comprising:
   identifying one or more flow lines in the 3D mesh, wherein each flow line includes by a set of connecting edges;
   computing a different reduction cost by using a processor for each connecting edge within the 3D mesh based on a cost metric reflecting a plurality weighted factors, wherein a particular reduction cost estimates a decrease in image quality associated with removing an associated connecting edge from the 3D mesh, wherein each reduction cost is weighted based on a per-vertex modulation specified in a weight map associated with the 3D mesh;
   selecting a first connecting edge that connects a first vertex included in a first flow line within the 3D mesh and a second vertex included in a second flow line within the 3D mesh, wherein the first connecting edge is associated with a first reduction cost that is below a pre-determined threshold;
   determining a first flow line edge included in the first flow line, wherein a first endpoint of the first flow line edge is connected to the first vertex;
   determining a second flow line edge included in the second flow line, wherein the second flow line is adjacent to the first flow line, and wherein a second endpoint of the second flow line edge is connected to the second vertex;
   removing the first connecting edge, the first vertex, the second vertex and the first flow line edge;
   adding a new vertex having a position that preserves one or more flow fine characteristics of the first flow line and the second flow line;
   modifying the second flow line edge such that the second endpoint of the second flow line edge is connected to the new vertex; and
   storing the 3D mesh including the modified second flow line edge in memory.

2. The method of claim 1, further comprising the step steps of;
   computing a different reduction cost associated with each flow line edge included in the one or more flow lines that estimates a decrease in image quality associated with removing the flow line edge from the 3D mesh.

3. The method of claim 2, wherein the first flow line edge is associated with a lowest reduction coat.

4. The method of claim 1, further comprising the step of extending a second connecting edge connecting a third flow line and the second flow line to connect to the new vertex.

5. The method of claim 1, wherein the position of the new vertex is between a position of the first vertex and a position of the second vertex.

6. A computer-readable medium storing instructions for causing a computing device to reduce a three-dimensional (3D) mesh by performing the steps of:

identifying one or more flow lines in the 3D mesh, wherein each flow line includes a different set of flow line edges and is connected to an adjacent flow line by a set of connecting edges;

computing a different reduction cost for each connecting edge within the 3D mesh based on a cost metric reflecting a plurality of weighted factors, wherein a particular reduction cost estimates a decrease in image quality associated with removing an associated connecting edge from the 3D mesh, wherein each reduction cost is weighted based on a per-vertex modulation specified in a weight map associated with the 3D mesh;

selecting a first connecting edge that connects a first vertex included in a first flow line within the 3D mesh and a second vertex included in a second flow line within the 3D mesh, wherein the first connecting edge is associated with a first reduction cost that is below a pre-determined threshold;

determining a first flow line edge included in the first flow line, wherein a first endpoint of the first flow line edge is connected to the first vertex;

determining a second flow line edge included in the second flow line, wherein the second flow line is adjacent to the first flow line, and wherein a second endpoint of the second flow line edge is connected to the second vertex;

removing the first connecting edge, the first vertex, the second vertex and the first flow line edge;

adding a new vertex having a position that preserves one or more flow line characteristics of the first flow line and the second flow line;

modifying the second flow line edge such that the second endpoint of the second flow line edge is connected to the new vertex; and storing the 3D mesh including the modified second flow line edge in memory.

7. The computer-readable medium of claim 6, further comprising the step of:

computing a different reduction cost associated with each flow line edge included in the one or more flow lines that estimates a decrease in image quality associated with removing the flow line edge from the 3D mesh.

8. The computer-readable medium of claim 7, wherein the first flow line edge is associated with a lowest reduction cost.

9. The computer-readable medium of claim 6, further comprising the step of extending a second connecting edge connecting third flow line and the second flow line to connect to the new vertex.

10. The computer-readable medium of claim 6, wherein the position of the new vertex is between a position of the first vertex and a position of the second vertex.

11. The method of claim 1, wherein the plurality of weighted factors include a surface boundary factor that indicates whether a connecting edge is on a border of the 3D mesh.

12. The method of claim 1, wherein the plurality of weighted factors include an image property change factor that quantifies a change in an image property when a connecting edge is removed.

13. The computer-readable medium of claim 6, wherein the plurality of weighted factors include a surface boundary factor that indicates whether a connecting edge is on a border of the 3D mesh.

14. The computer-readable medium of claim 6, wherein the plurality of weighted factors include an image property change factor that quantifies a change in an image property when a connecting edge removed.

* * * * *

UNITED STATES PATENT AND TRADEMARK OFFICE
CERTIFICATE OF CORRECTION

| | | |
|---|---|---|
| PATENT NO. | : 7,733,338 B2 | Page 1 of 1 |
| APPLICATION NO. | : 10/894524 | |
| DATED | : June 8, 2010 | |
| INVENTOR(S) | : Jerome Couture-Gagnon | |

It is certified that error appears in the above-identified patent and that said Letters Patent is hereby corrected as shown below:

In column 10, line 46, please replace "fine" with --line--.

In column 10, line 53, please replace "step steps" with --step--.

In column 12, line 12, please replace "connecting" with --connecting a--.

In column 12, line 34, please replace "edge" with --edge is--.

Signed and Sealed this

Twenty-third Day of November, 2010

David J. Kappos
*Director of the United States Patent and Trademark Office*